JOSEPH H. DEACON, OF LUMBERTON, NEW JERSEY.

*Letters Patent No. 86,284, dated January 26, 1869.*

IMPROVED ALCOHOLIC LIQUOR FROM RHUBARB-PLANT.

The Schedule referred to in these Letters Patent and making part of the same.

*To all whom it may concern:*

Be it known that I, JOSEPH H. DEACON, of Lumberton, in the county of Burlington, in the State of New Jersey, have invented a new Alcoholic Liquor, obtained by Distilling the Juice of the Rhubarb-Plant; and I do hereby declare that the following is a full, clear, and exact description of my process for manufacturing the same.

I take the stalk of the rhubarb-plant, and wash and clean it nicely, then grind and press it, thereby extracting all the juice practicable. To said juice I add about one-half its quantity of water, and then add about three pounds of sugar to the gallon. I allow the mixture to ferment a week or so in casks, and when fermentation is over, I bung the cask up, and keep it still for two or three weeks. I then draw the liquor off, and put it up in casks, and store it, ready for distillation. When the liquor has remained in the casks a sufficient time, (I prefer about one year,) I distil it by the ordinary process of distillation, thus producing a brandy which has been found highly useful for medicinal purposes, as well as a pleasant and healthful alcoholic beverage. Before distillation, I add to each gallon of the fermented liquor about one-fifth of pure rectified spirits.

I claim, as a new article of manufacture—

An alcoholic liquor, obtained by distillation from the rhubarb-plant, substantially as described.

JOS. H. DEACON.

Witnesses:
J. F. LAUMASTER,
RICHARD P. COLEMAN.